Inventor
J. L. L. DELVAUX
By Holcombe, Wetherill & Brisebois
Attorneys

Inventor
J. L. L. DELVAUX
By
Holcombe, Wetherill + Brisebois
Attorneys

Inventor
J.L.L. DELVAUX
By Holcombe, Wetherill & Brisebois
Attorneys

Inventor
J. L. L. DELVAUX
By Holcombe, Wetherill & Brisebois
Attorneys

United States Patent Office 3,424,861

Patented Jan. 28, 1969

3,424,861

RECORDING AND READING SYSTEM FOR COLOR TELEVISION AND ANALOGOUS ANGLE-MODULATED SIGNALS

Jean L. L. Delvaux, Paris, France, assignor to Compagnie Francaise Thomson Houston-Hotchkiss Brandt, Paris, France, a corporation of France Filed Jan. 28, 1966, Ser. No. 523,765

Claims priority, application France, Feb. 10, 1965, 5,030

U.S. Cl. 178—5.2 12 Claims

Int. Cl. H04n *1/46, 9/00*

ABSTRACT OF THE DISCLOSURE

Color TV information recorded on tape (4) includes a frequency-modulated chrominance signal and a "first control signal" at the carrier frequency thereof and time-coextensive therewith, derived from an intermittent burst signal present in the chrominance signal. The information as read by head (23) is separated by filter (24) into the color TV signal (and burst) which is applied to variable delay network (29) and first control signal which after demodulation (27) is applied to one side of phase comparator (44). The variably delayed signal from (29) after demodulation (31) is delivered to output (32), and is simultaneously applied to circuit (36) which derives, from the burst, a second control signal and this is applied to the other side of comparator (44). Comparator output controls variable delay device (29) to compensate for time discrepancies between first and second control signals. See FIG. 2.

This invention relates to angle modulation systems and its chief utility lies in the field of color television. It will therefore be disclosed with particular reference to color television equipment, although it is to be understood that the teachings of the invention may conceivably be embodied in other applications in the broad field of communications.

In color television systems of various types widely used at the present time, including the type that is standard in the United States in accordance with the specifications laid down by the National Television System Committee (NTSC), the complete color television signal must convey both luminance, or black-and-white, information, and chrominance, or color, information. The luminance signal is provided by amplitude-modulating a carrier, while the chrominance signal—or each one thereof—is provided by angle-modulating a sub-carrier frequency, the term "angle" being here used in a sense that is generic to both frequency and phase, in accordance with the recognized usage in the art. This sub-carrier frequency is selected within the broad frequency band comprising the luminance signal.

When retrieving the color television information, as at the receiving end of a television link, there is the necessity of demodulating the chrominance signal by means of the subcarrier frequency. Since it would be uneconomical to transmit the subcarrier over a specially provided channel for the purpose of demodulating the chrominance signal, the following expedient is used in systems of the above specified type. Advantage is taken of the blanking intervals necessarily provided in a television transmission process, i.e. during the periods between successive line scanning cycles, to convey the subcarrier synchronizing information through the same channel as that used for the picture signal. The subcarrier frequency synchronizing information is transmitted as a burst signal comprising e.g. eight to twelve cycles of the subcarrier frequency at a predetermined phase. Such burst usually follows immediately upon the line synchronizing pulse during the blanking interval. On retrieval of the information, as at the television receiver, the burst is separated from the remainder of the signal as by a gating circuit, and is compared in phase with the output of a local subcarrier oscillator in a phase discriminator. The error signal produced by the discriminator in case of a discrepancy between the phase of the local subcarrier frequency and the phase condition determined by the burst signal, serves to maintain the desired synchronism in the chrominance signal demodulation operation throughout the scanning of every line. An alternative procedure is to apply the gated burst to the input of a highly selective filter and use the output signal from the filter for demodulating the chrominance signal.

While the above-outlined general method of processing the chrominance signal is now standard in color television work, primarily for reasons of economy in channel bandwidth, the result is far from being satisfactory insofar as the color stability of the television image is concerned. Since the phase reference used for demodulating the chrominance signal at the retrieval station throughout each line scan is a control signal derived at said retrieval station from a short burst of only a few cycles prior to the start of the line, it is clear that any irregularity that may intervene in the chrominance signal at any point of the line scan subsequent to the burst will be manifested as a phase deviation that will not be corrected by the control signal, resulting in color distortion. This deficiency contributes greatly to the color instability that besets many present-day color television systems.

The above noted irregularities introduced into the video signal and conducive to uncorrected phase distortions in the chrominance signal, are the result of small, erratic, variations in the time of signal transfer through the system, which in turn may be caused by unavoidable imperfections in the equipment and/or inevitable disturbances in the propagation or transfer medium.

It is an important object of the invention to eliminate the effect of such erratic disturbances in propagation or transfer time on the chrominance signal in a color TV signal, and thereby considerably to improve color stability in a color TV system. A broader object is to achieve a similar result in connection with any type of angle-modulated information-bearing signal in a system wherein the synchronization of the signal-retrieving step is (or can be) achieved by means of short intermittent bursts.

The difficulties which the present invention sets out to overcome can occur both in systems where the signal is transferred from a transmitter to a receiver by way of a radio or other link, and also in systems where the signal is being recorded on a recording medium, e.g. a magnetic tape, and subsequently played back from said medium. In systems of the first (or "transmission") type, a frequent source of erratic disturbance is the short-term fluctuations in propagation conditions. Similarly in systems of the second (recording) type, there may occur minute dimensional deformations in the tape or other recording medium, produced after the recording has been, completed and before playback. Also, in this second (recording) type of system, fluctuations in the relative velocity between the tape and the recording and reading heads have similar effects. The above are but examples of the many types of transfer disturbance effectively eliminated by the present invention.

As used in the present specification and claims, expressions such as "signal transfer system" are to be construed as generic to both broad classes of system defined above. The "transfer medium" refers, in systems of the first class, to the medium of propagation of electromagnetic waves, and refers in systems of the second class to the medium, such as magnetic tape, on which the signals are recorded. "Transfer section" and "recovery section" refer to the transmitter and receiver sections respectively in systems of the first class, and the same expressions refer to the recording and playback sections respectively in systems of the second class. Other generic expressions used herein are to be construed in respectively analogous senses, as will be evident in the light of the context.

Various means have been proposed in the past to reduce chrominance signal instability in color TV systems, as due to the above defined causes. Usually these earlier means have tended to introduce secondary distortion effects of their own. Further, they have involved the need to alter the composite color TV signal to a form departing from that laid down by NTSC specifications. Important objects of this invention are to provide means for solving the above defined problem which will be simple and effective, will not introduce secondary distortion effects, and will be fully compatible with the present color TV signal specifications of the National Television System Committee of the United States.

The invention will now be disclosed in detail with reference to the accompanying drawings, wherein.

Figures 4A, 4B, 4C:
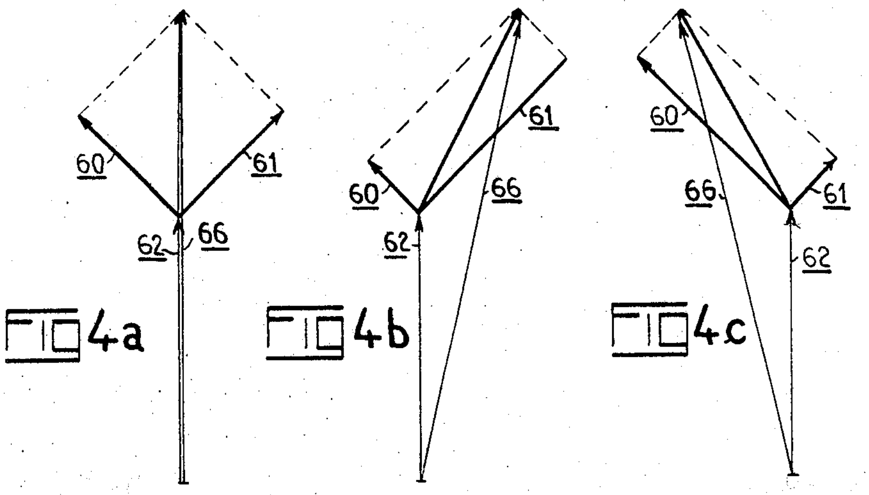
Figure 5:
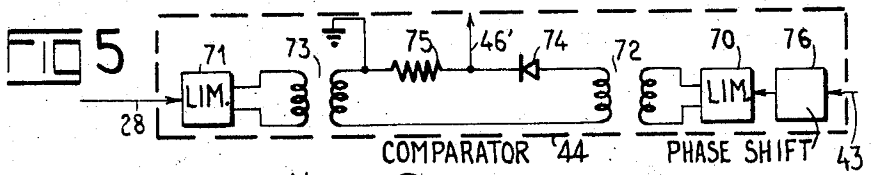
Figure 6:
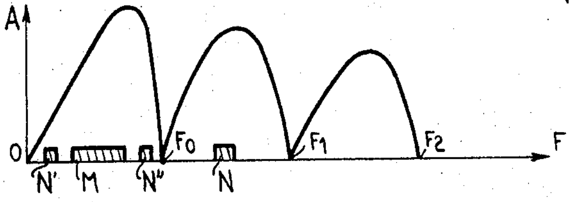
Figure 7:
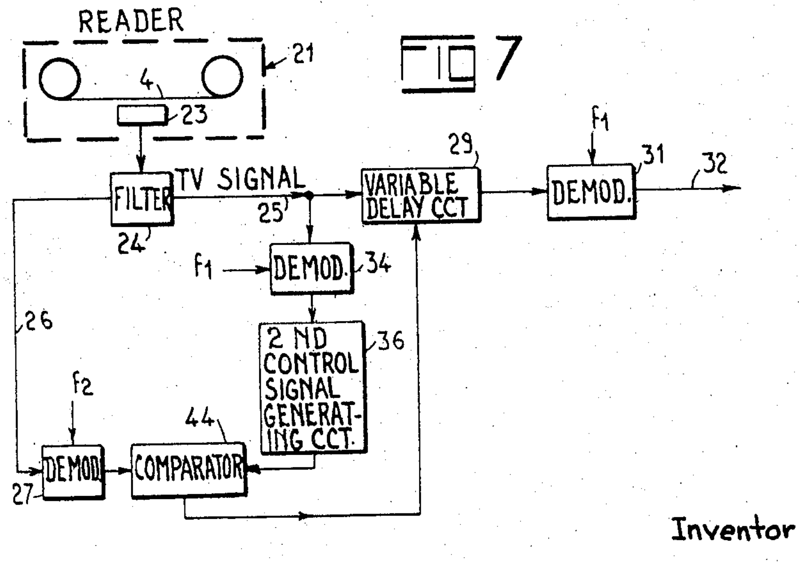
Figure 8:
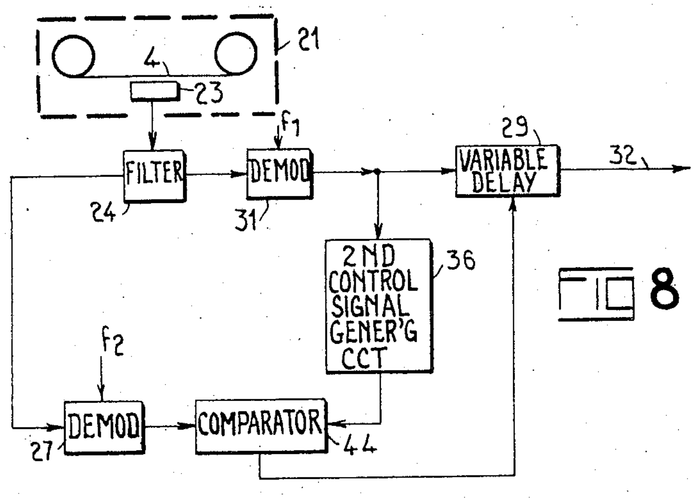
Figure 9:
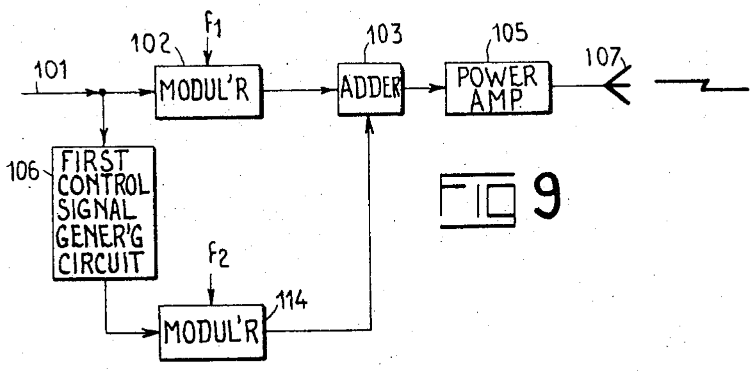
Figure 10:
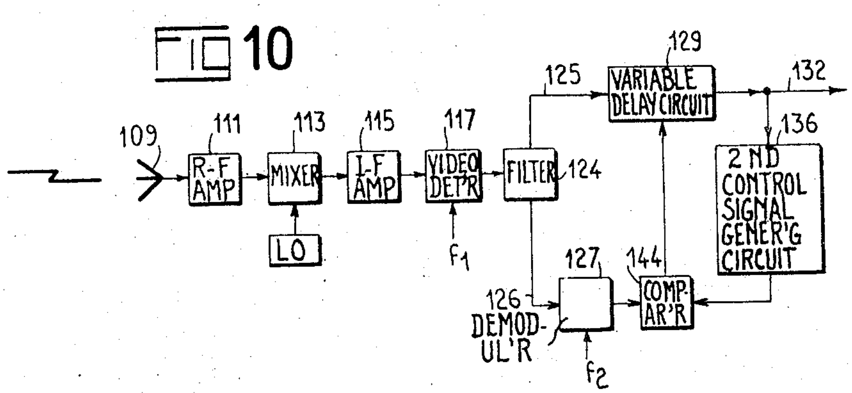
Figures 11, 12, 13:
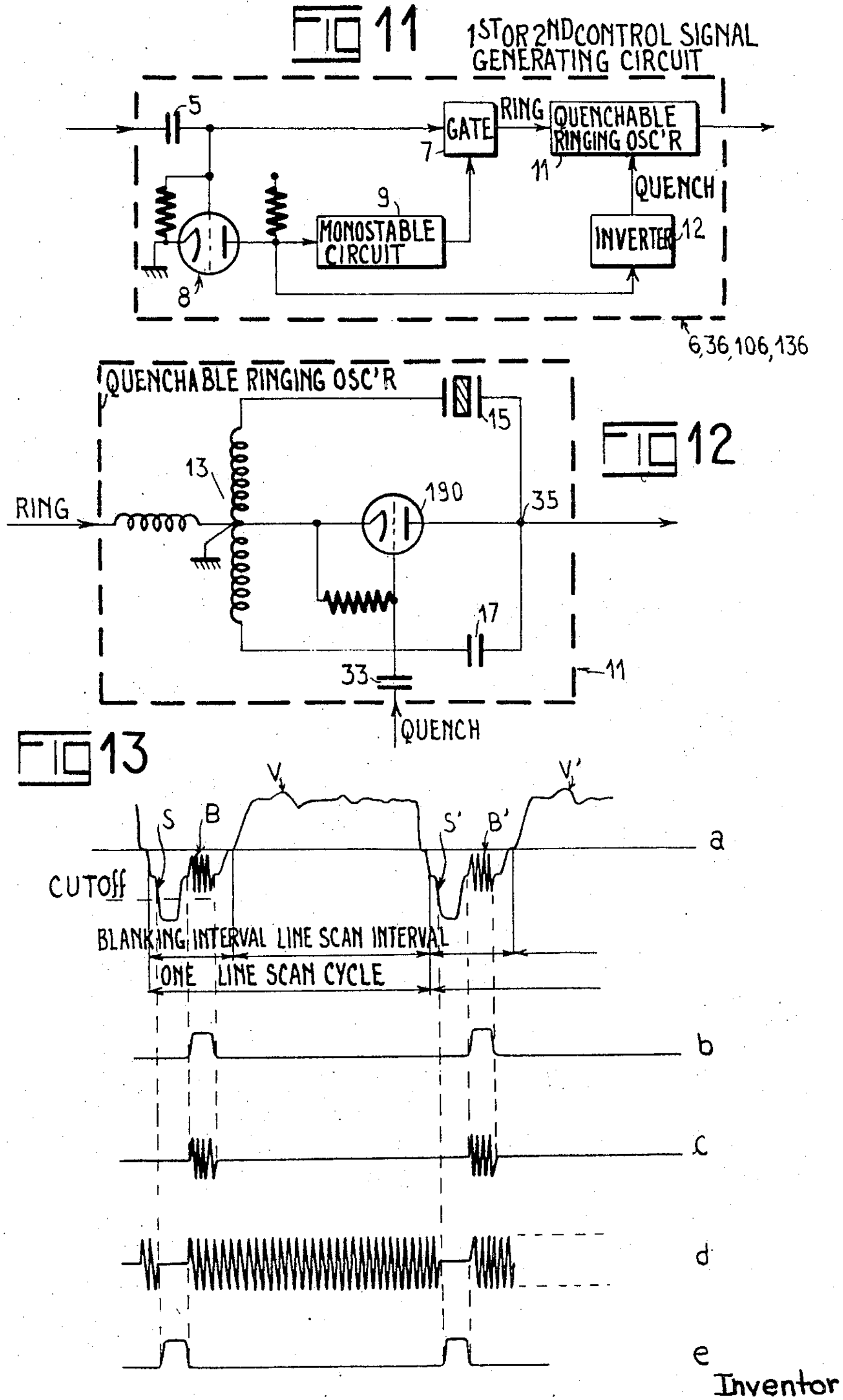

FIGS. 4*a*, 4*b* and 4*c* are phasor diagrams illustrating the operation of the invention;

FIG. 5 is a circuit diagram of one form of phase discriminator or comparator usable in the invention;

FIG. 6 shows a typical frequency response curve for a tape recorder and the manner in which it is taken advantage of in accordance with an aspect of the invention;

FIG. 7 illustrates a modified construction of the reading or playback section of the system;

FIG. 8 shows a further modification of said section;

FIG. 9 is a functional diagram illustrating the transmitter section of a color TV link provided with the improvement of the invention;

FIG. 10 illustrates one embodiment of the receiver section of the color TV link;

FIG. 11 is a diagram, partly in block and partly in circuit schematic form, of a control signal generating circuit usable in each of the various embodiments of the invention shown in FIGS. 1, 2, 7, 8, 9 and 10;

FIG. 12 is a circuit diagram of a ringing oscillator shown in block form in FIG. 11; and FIG. 13 shows a set of waveforms useful in explaining the operation of the invention.

The embodiments of the invention to be first described relate to the recording of a color television signal on magnetic tape which is to be subsequently played back for broadcasting or in a closed-circuit TV system. In such an application, according to the terminology earlier defined herein, the "transfer section" of the invention constitutes the recording apparatus while the "recovery section" constitutes the playback or reproducing apparatus; the "transfer medium" being, of course, the recording medium, specifically the magnetic record tape.

Figures 1, 2, 2A:
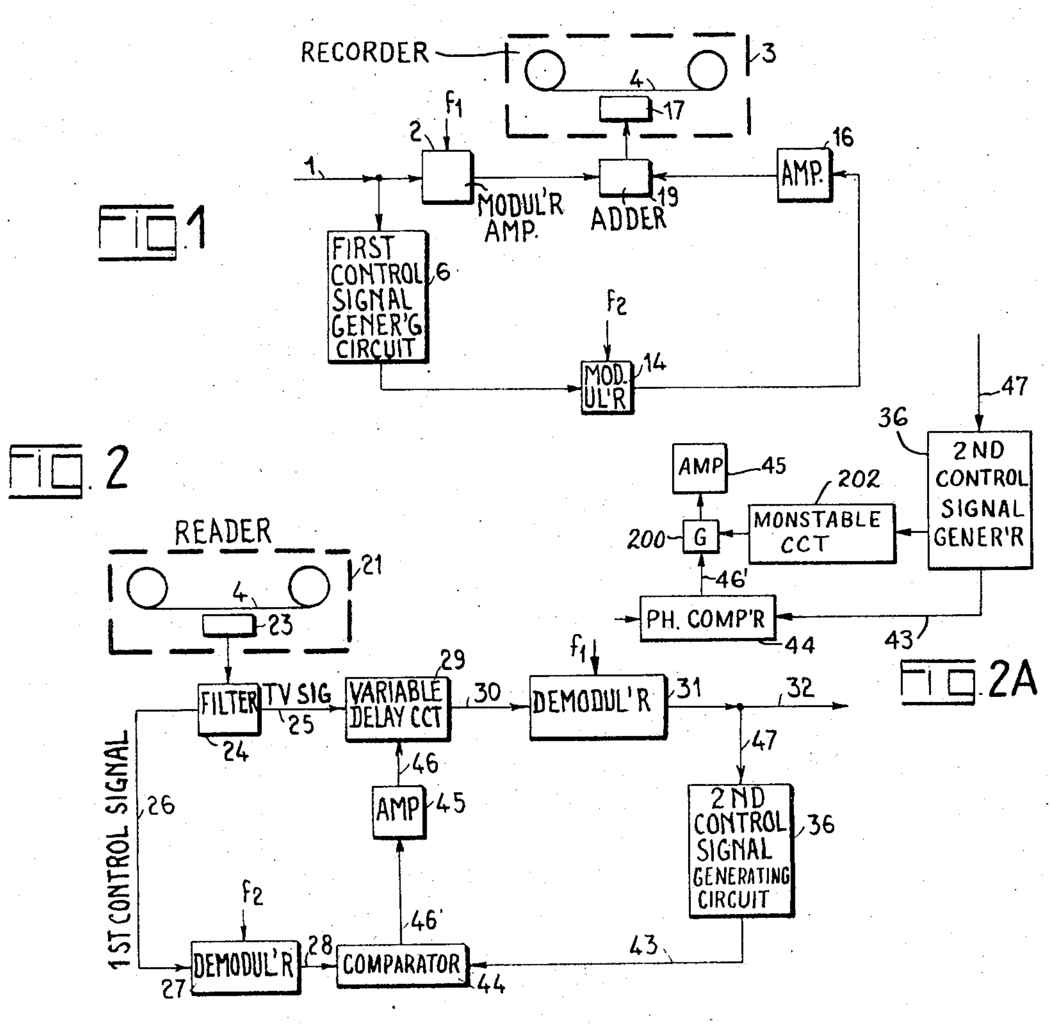
FIG. 1 is a block diagram of the recording section of a color television recording system provided with the improvement of the invention.
FIG. 2 shows the reading or playback section of the same system, in one embodiment.
FIG. 2A is a partial view of a modification of FIG. 2.

FIG. 1 illustrates the transfer section as including a conventional tape recorder schematically indicated as the unit 3 which includes a magnetic tape 4 fed through suitable mechanism past a recording head 17. In a recording operation, a color television signal is applied by way of an input line 1, such as a coaxial line, to modulating and amplifying circuitry generally designated 2, which is conventional and usually forms part of the tape recorder unit 3. In the circuit 2, the video signal is used to frequency-modulate a suitable intermediate frequency wave $f_1$ and the frequency-modulated wave is applied to the recording head 17, to be recorded thereby as a corresponding variable magnetic pattern upon the tape 4, in the usual way. As shown, the frequency-modulated signal is applied to recording head 17 by way of an adding circuit 19 for reasons that will presently appear.

The waveform of the color TV signal applied to the input 1 is typically illustrated in FIG. 13, upper line *a*. The signal shown includes one complete canning cycle, that is a blanking interval followed by an operative line scan interval that contains the video signal V proper. The blanking interval includes a line synchronizing pulse S, serving to trigger the line scanning generators at the receiver. The blanking interval of the color TV signal further includes the so-called "burst" B, which consists of a few cycles, say ten or twelve, of the chrominance subcarrier frequency. This burst will serve, in the information-recovery step, as a phase reference for demodulating the chrominance component present in the video signal, according to the standard procedure in color television. The chrominance subcarrier frequency, i.e. the frequency of the burst B, may be about 3.58 megacycles (U.S. standard) or about 4.43 mc. (European standard).

Returning to FIG. 1, in accordance with the present invention the complete TV signal at input 1 is simultaneously applied by way of a branch line to a first control signal generator circuit generally designated 6. The construction and detailed operation of this circuit will be described in detail further on. At this point it is sufficient to indicate that circuit 6 delivers at its output a control signal waveform of the type shown in line *d* of FIG. 13. That is, the said control signal constitutes a continuous wavetrain at the subcarrier or burst frequency and in precise cophasal relation with the burst B throughout the duration of said wavetrain. The control signal wavetrain is initiated substantially simultaneously with the burst B, and is seen to persist throughout the subsequent video signal interval of the line scan cycle, and terminate at the start of the line sync pulse S' of the next following line scan cycle.

Thus the first control signal generating circuit 6 of FIG. 1 delivers a series of wavetrains at the chrominance subcarrier frequency of e.g. 4.43 mc. by European standards, every such wavetrain extending throughout the line scan cycle following the burst that initiated the wavetrain.

The control signal delivered by circuit 6 is applied to the modulating input of a modulator 14 where it serves to modulate an auxiliary carrier wave of frequency $f_2$, preferably by frequency-modulation. The modulation signal is applied to an amplifier 16 and the amplified signal is mixed in adder 19 with the signal from modulator 2 at the input of the recording head 17, to be recorded simultaneously with the modulated TV signal upon the magnetic tape 4.

Thus, the final signal recorded by head 17 on the tape 4 comprises the total color TV signal plus a control signal, herein termed the "first control signal," which is an oscillatory wavetrain at the reference frequency and phase determined by the burst in the input signal but extending over the full line scan interval. This composite signal recorded on the tape, when played back at some subsequent time and possibly some other place, is processed in the maner now to be described with reference to FIG. 2.

In FIG. 2 the record tape 4 is shown passed through a conventional magnetic playback or reading unit 21, which may (insofar as the invention is concerned) be identical with recording unit 3, past a reading head 23. The composite signal read by the reading head 23 is passed through an amplifying and filtering circuit 24, where it is separated into its components at the respective moduland frequencies $f_1$ and $f_2$. The $f_1$ frequency component, which constitutes the color TV signal, is applied to line 25, and the $f_2$ frequency component, which comprises the first control signal, is applied to line 26. The TV signal is passed by line 25 to a variable delay network 29 controlled in a manner later described, and the variably delayed TV signal from network 29 is passed by a line 30 to an amplitude limiting and demodulating circuit 31 of the frequency-discriminating type in which it is demodulated with respect to the same frequency $f_1$ as the original TV modulating frequency. Thus the output signal appearing on output line 32 is a video signal which contains all of the original color TV information.

This output signal from line 32 is tapped by means of a branch line 47 and applied to a second control signal generating circuit 36 essentially identical to the first control signal generating circuit 6 used in the recording section of the system (FIG. 1). Circuit 36 consequently operates to develop a second control signal in the form of a continuous wavetrain similar to the first control signal as recorded on the tape and as shown in line *d* of FIG. 13.

This second signal is applied from the output 43 of circuit 36 to one input of a phase discriminator or comparator 44. The other input of comparator 44 is fed with the output of a demodulator 27. This demodulator receives as its input the first control signal applied thereto through line 26 from the filter 24 and acts to demodulate said signal by frequency-discrimination thereof against a mid-frequency which is equal to the $f_2$ frequency which served originally to modulate said first control signal prior to recording on the tape.

The first and second control signals applied to the respective inputs of comparator 44 are, as just indicated, essentially similar, both having the general form shown in FIG. 13 line *d*. The two signals, however, differ from each other in one significant respect. Inasmuch as the first control signal applied to comparator input 28 was derived from the burst prior to recording and was then recorded on the tape together with the TV signal, any erratic phase distortion and disturbances that may have affected the color TV signal relative to the true reference phase condition as determined by the initial burst, during the transfer process (including the recording and reading operations), also affect the first control signal. In contrast, the second control signal applied to comparator input 43 is derived from the burst after read-out, and consequently is unaffected by any such disturbance sustained during the transfer process with respect to the burst, but retains a constant phase relation with respect to the burst throughout the line scanning interval that follows. The error signal delivered by comparator 44 will, therefore, represent a measure of the said erratic disturbances and distortions sustained by the color TV signal during transfer (such erratic disturbances and distortions are herein referred to as "transfer disturbance").

The error signal from comparator 44, which is a measure of transfer disturbance, is applied, after amplification in an amplifier 45 if necessary, to the controlling input 46 of variable delay device 29. Thus, the phase or timing of the television signal passed through delay line 29 to the demodulator 31 is subjected throughout the line scan interval under consideration, to a continuous variation in phase such as to compensate precisely for the erratic phase variations caused by transfer disturbance. The output TV signal, therefore has its all-important chrominance component (or components) correctly phased in regard to the luminance component (and in regard to one another) and truer colors are obtained in the televised picture.

The construction of the first and second control signal generator circuits 6 (FIG. 1) and 36 (FIG. 2) will now be described. As shown in FIG. 11, each such circuit may include a conventional gate circuit schematically indicated at 7. The total color TV signal dervied from input 1 (FIG. 1) or output 32 (FIG. 2) is applied (where necessary through a phase inverter, not shown) by way of an input capacity 5 the signal input of gate 7, and also to the input of a gating pulse generator 8. This generator 8 is shown as a simple triode having a grounded cathode and having its anode connected through a resistor to a suitable anode voltage. The grid bias resistor is so selected in conjunction with the anode voltage of the tube, that when the total TV signal (FIG. 13)(*a*) is applied to the grid of the tube, the tube 8 acts as a threshold separator to cut off or suppress the video signal V and the burst pulse B, together with part of the line sync pulse S, and to pass only part of said sync pulse S beyond the cutoff level (indicated as "cutoff" in FIG. 13)(*a*), to the anode of the tube. The positive-going trailing-edge of the partial sync pulse B passed by tube 8 is applied to the input of a conventional monostable circuit 9, triggering the latter from its stable to its unstable state. Monostable circuit 9 has its time constant so adjusted that when thus triggered it remains in its unstable state for a fixed time interval substantially corresponding in duration to that of the burst pulse B in the TV signal, after which circuit 9 relapses to its stable state. While in its unstable state circuit 9 produces a pulse which is applied to the gating input of gate 7 to open the gate and enable it to pass a signal. It will therefore be evident that the gate 7 will pass to its output only the burst pulse portion B in the total TV signal applied to its input.

The above action will be clear from a reference to FIG. 13, where line *b* indicates the gating pulses determined by the set states of monostable circuit 9, and substantially coextensive with the burst pulses B in the total TV signal, while line *c* indicates the burst pulses passed by gate 7.

The burst pulses passed through gate 7 are applied to the ringing input of a quenchable ringing oscillator 11, which is thereupon set into oscillation at the frequency of the burst signal, producing a continuous wavetrain at the said frequency. Oscillator 11 has a quenching input, which is supplied from the anode output of threshold separator or gating pulse generator tube 8, as here shown by way of a conventional inverter triode stage schematically shown at 12. The negative-going leading edge of each gating pulse derived by tube 8 from the line sync pulse S, after polarity inversion in inverter 12, serves to arrest the oscillatory operation of ringing oscillator 11 (as presently described in detail) and terminate the wavetrain delivered thereby. Oscillator 11 therefore produces an output as shown in FIG. 13 (*d*) earlier described. The quenching pulses applied to the oscillator 11 are shown in line *e* of FIG. 13.

FIG. 12 illustrates a suitable circuit for use as the quenchable ringing oscillator 11 in the control signal generating circuits 6 and 36. As shown, the ringing input from gate 7 is applied to one end of the primary winding of a coupling transformer 13, the other end of the primary winding being connected to the grounded midpoint of the secondary winding of the transformer. The transformer secondary has one end connected to one electrode of a crystal 15 adjusted to oscillate at the frequency of the burst pulse, and has its other end connected to one electrode of a capacitor 17 of a suitable value to balance the capacitance of the crystal. The free electrodes of crystal 15 and capacitor 17 are connected to a common junction 35 which provides the output of the quenchable ringing oscillator 11 and the output of the control signal generating circuit 6 or 36. Connected across the grounded midpoint of the secondary winding of transformer 13 and the output junction 35, are the cathode and plate of a triode tube 190. The grid of tube 190, grounded by way of a suitable biassing resistor, has the quenching pulses applied to it by way of a capacitor 33. In operation, tube 190 is normally non-conductive, and the oscillator circuit will therefore respond to every burst pulse applied across the secondary of transformer 13 from its "ringing" input connected to gate 7, by producing a continuous wavetrain at the burst frequency as stabilized by crystal 15 and in accurate phase relation with the initial ringing burst. The application of a quenching pulse to the grid of tube 190 renders the tube conductive thereby shorting the oscillator circuit and quenching the oscillatory output.

As shown in FIG. 2A a gate 200 may if desired be interposed in the error signal path from comparator 44 to variable delay device 29. The gating input to gate 200 is connected to the control signal generator 36, e.g. the plate output of pulse generator tube 8 by way of a monostable circuit 202, so as to open gate 200 and permit effective action of the error signal only during the actual line scan intervals.

FIG. 7 shows a modification of the color TV record playback system first described with reference to FIG. 2. The arrangement is generally similar to that of FIG. 2, and similar components have been designated with similar numbers and will not again be described. The chief difference is, that the input for the second control signal generator 36 (which may be similar to the circuit of FIGS. 11 and 12) instead of being tapped by way of a branch line from the output line 32 of the system as in FIG. 2, is derived by way of a branch line from the line 25 ahead of the variable delay device 29. Thus the TV signal tapped on the branch line is the modulated signal, and is accordingly in this embodiment passed through a demodulator 34 in which it is discriminated against the carrier frequency $f_1$. The demodulated signal is then applied to the input of the second control signal generator circuit 36. In other respects, the system may be similar to that of FIG. 2; however, the error signal amplifier 45 (FIG. 2) may often in this case be omitted, as here shown.

It will be recognized that while the system described with reference to FIG. 2 is a feedback control system, the modification of FIG. 7 is a "forward-feed" control system in that the control quantity is derived from the input signal ahead of the variable device 29 rather than the output signal. The over-all operation is equivalent to that of FIG. 2. That is, the error signal from the output of comparator 44 acts to vary the delay imparted to the output signal by variable delay device 29 in such a manner as to compensate for the transfer disturbance sustained by the signal and impart the proper phasing to the signal components including the chrominance signal component throughout the line scanning cycle, thereby preventing spurious color shifts in the televised picture.

A further modification is partly illustrated in FIG. 8. In this case, the TV signal from the separator filter 24 is passed through a demodulator 31 ahead of the variable delay device 29 rather than beyond said device as in both FIGS. 2 and 7. The demodulated TV signal is tapped from the output of demodulator 31 and is applied to the second control signal generator circuit 36 (which may again be similar to the circuit disclosed with reference to FIGS. 11 and 12). The control signal from circuit 36 is again applied to the phase comparator 44, and the error signal from the comparator, if necessary after an amplification step not shown, is applied to the control input of variable phase shifter or delay device 29. The operation is seen to be the same as that in FIG. 7, except that the compensatory time-varying step is in this case applied to the final, demodulated, video signal.

Figure 3:
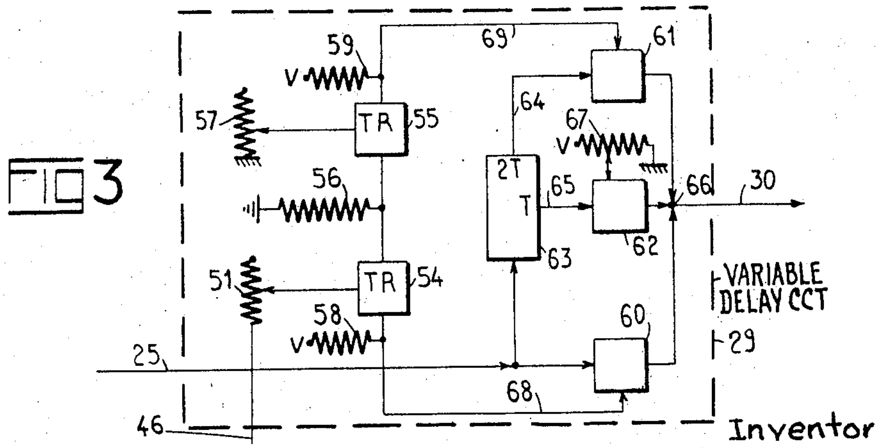
FIG. 3 is a circuit diagram of one form of variable delay device usable in the system of FIG. 2.

FIG. 3 illustrates in schematic form one suitable embodiment of the variable delay device 29 usable in any one of the systems disclosed with reference to FIGS. 2, 7 or 8. The error signal from the phase comparator 44 (possibly after amplification as in the case of FIG. 2), is applied by line 46 to one end of a potentiometer resistor 51 having an adjustable tap connected with the control electrode of a first element, e.g. with the base of a first transistor 54. Adjustment of potentiometer 51 thus enables adjustment of the amplitude of the error signal effectively applied to the element 54. Element 54 is connected with another element, e.g. transistor 55 in a symmetrical amplifying arrangement. Element 55 has its control electrode (such as the base of the transistor) connected to a fixed adjustable potential provided by a potentiometer 57. The transistors 54, 55 may be mounted in a common emitter circuit with both emitters being grounded by way of a high common resistance 56 to maintain the total current flow through both transistors substantially constant. The collectors may be connected to a voltage source through load resistors 58 and 59. With this arrangement, the current flowing through the collector circuits of the respective transistors and hence the voltage drops across the load resistors 58 and 59 will be varied reversely with respect to each other on variation of the error signal applied to the input 46. The collector voltages from the transistors are applied by the leads 68 and 69 to the control elements (e.g. grids) of respective variable-conductance devices 60 and 61, preferably tubes, so as to vary the gain therethrough. A third variable-conductance device 62, e.g. tube, has its control element, e.g. control grid, connected to the voltage source through a potentiometer 67 so as to provide an adjustable, fixed gain through said third device 62. All three variable-conductance devices 60, 61, 62 have their output elements, e.g. anodes, connected to a common output junction 66. The circuit further includes a two-output delay line 63 which receives at its input the television signal present on lead 25 and delivers a first delayed output signal at its first output 65, and a second delayed output signal at its second output 64, the delay at output 64 being e.g. twice the delay provided at output 65. For example, the signal appearing at output 65 may be delayed 0.02 microsecond with respect to the TV signal applied over the lead 25, and the signal appearing at output 64 may be delayed 0.04 microsecond relative to the original TV signal. The variable-transconductance devices 60, 61, 62 may be type 6AS6 type tubes.

The first variable-gain device 60 has the undelayed TV signal on line 25 applied to its input element, e.g. emitter, the fixedly-adjusted variable-gain device 62 has the moderately-delayed signal from delay line output 65 applied to its input element, and the second variable-delay device 61 has the fully-delayed signal from delay line output 64 applied to its input element.

In operation, it will be recognized that the network comprising the three variable-gain devices 60, 61, 62 constitutes a vector adding network and that the output signal appearing at junction 66 is the vector sum of the three signals passed thereto by said three devices from signal line 25 and the outputs 64 and 65 of the delay line 63, respectively. It will also be understood that whereas the fixedly adjusted variable-gain device 62 passes a fixed proportion of the intermediately-delayed signal from 65 as said proportion is determined by the setting of potentiometer 67, the two variable-gain devices 60 and 61 pass variable amounts of the undelayed and fully-delayed signals from 25 to 64 respectively, said amounts being determined by the oppositely-varying voltages applied thereto over lines 68 and 69 in dependency on the error signal applied to the circuit input 46 as modified by the settings of potentiometers 51 and 57.

With the above in mind the operation of the circuit 29 will be clear from a consideration of the phasor diagrams of FIG. 4. In each of the three diagrams the vectors indicated $\underline{60}$, $\underline{61}$, $\underline{62}$ represent in amplitude and phase, the signals applied to junction 66 by the three amplifier elements 60, 61, 62, and the resultant vector $\underline{66}$ consequently represents the total output signal present at said junction 66. In each diagram the vectors $\underline{60}$ and $\underline{61}$ are shown symmetrically angled on opposite sides of vector $\underline{62}$ because the relative delay of the signal through device 62 over the signal through device 60 is one half the relative delay of the signal through device 61, as described above.

In FIG. 4*a*, the error signal applied at 46 is assumed to be of an intermediate value as determined by the adjustment of potentiometers 51 and 57, such that the voltages applied through 68 and 69 to both variable-gain devices 60 and 61 are equal. These devices therefore pass equal amounts of the related signals, and the representative vectors 60 and 61 are of equal amplitude. The diagram shows that in this condition the output signal 66 is cophasal with the signal 62 derived from the intermediate delay tap 65 of the delay line 63. In FIG. 4*b*, the error signal at 46 is assumed to have departed from its preset intermediate value, e.g. decreased, so that the voltages on lines 68 and 69 have varied by equal amounts in opposite senses to increase the amount of fully-delayed signal passed by device 61 and correspondingly decrease the amount of undelayed signal passed by device 60. The resultant signal 66 is now seen to be delayed over the TV signals present on line 25 by an amount greater than the intermediate delay provided at the output 65 of the delay device. Conversely, in FIG. 4*c* the error signal is assumed to have departed from its midvalue in the opposite sense, e.g. increased, and the resultant signal at junction 66 is now seen to be delayed by less than said intermediate delay.

Thus, the network 29 is seen to impart to the TV signal passed through it a variable delay or phase shift depending on the amplitude of the error signal delivered by comparator 44, and hence proportionate with the degree of transfer disturbance sustained by the TV signal. It will be readily apparent that with a suitable adjustment of the potentiometers, and provided proper phase relationships are maintained through a correct relative arrangement of the connections of lines 68 and 69 as will be readily understood, the variable delay can be made to cancel substantially the transfer disturbance.

While the variable delay network described with reference to FIGS. 3 and 4 is found advantageous, especially because of its rapid response, absence of distortion and ease of adjustment, various other networks may be used for similar purposes. The range of delay variation that can be provided by means of the network shown in FIG. 3 is somewhat limited and, while said range is found generally sufficient for the purposes of the invention, the available time delay range can be greatly increased, where this is found necessary, by providing two or more networks of the kind shown in FIG. 3 connected in cascade. In such a cascaded arrangement, the output 66 of one network 29 would be connected to the input such as 25 of the next network. In each of the cascaded networks other than the first, the error signal applied to the input corresponding to error input 46 (FIG. 3) would be delayed successive incremental amounts corresponding to the intermediate delay imparted by each of the delay devices 63.

FIG. 5 illustrates a suitable embodiment of the phase discriminator or comparator generally designated 44 in FIGS. 2, 7 and 8. The illustrated circuit comprises two transformers 72 and 73 having their secondary windings connected in series with a diode 74 and a load resistor 75. The two signals to be compared are applied to the primaries of the respective transformers by way of the input lines 28, 43, through conventional amplitude limiters 70, 71. An adjustable phase shifter 76 is preferably connected in one of the two input lines, e.g. 43. The arrangement is such that when the two input signals are substantially in phase quadrature, the voltage induced in the secondaries of transformers 72, 73 combine to impart a predetermined intermediate value to the current passed by diode 75 and the output voltage across resistor 75 then assumes a corresponding intermediate value. Should the signal at input 28 lag by less than 90° behind the signal at input 43, there is a corresponding decrease in the current passed by diode 74 and in the voltage drop across resistor 75. Should the phase angle increase beyond 90° the said current and voltage drop will increase. The error voltage is derived across resistor 75 between terminal 46′ and ground.

An important aspect of the invention relates to the proper choice of the carrier frequency $f_2$ used to transfer the control signal or more specifically in the embodiments so far disclosed, to record said control signal on the magnetic tape. To facilitate the requisite separation of the control signal from the main signal, it is contemplated that said carrier frequency $f_2$ should lie substantially outside the bandwidth of the main signal. The modulated color television signal to be transferred usually has a bandwidth of from only a few hundred kilocycles to as high as 6 to 10 megacycles. The burst frequency is 4.43 megacycles according to European standards, and is seen to lie within this range; hence it cannot conveniently be recorded (or more broadly transferred) at its original frequency since it would not then be readily separable as is required in the system of the invention. In the herein disclosed embodiments, the burst signal is shown as modulating a suitable frequency $f_2$ prior to recording on the tape, and the carrier frequency $f_2$ should accordingly be selected at a value somewhat above the upper limit of the above-mentioned bandwidth of the television signal, say a value of 12 megacycles. Instead of modulating the control signal derived from the burst frequency, however, its frequency may be brought to the requisite high value before recording, by a frequency-multiplication step. In that case, it will be understood that the modulator 14 in FIG. 1 would simply have to be replaced by a frequency multiplier of a suitable preferably integral ratio (e.g. the ratio 3), and correspondingly the demodulator designated 27 in each of FIGS. 2, 7 and 8 would be replaced by a frequency divider of equal ratio (e.g. 3).

It may also in some cases be feasible to record the control signal on the tape at a low frequency value below the lower limit of the bandwidth of the television signal, say a value of 70 kc. This can be done by using a frequency divider of appropriate ratio (say 64) in place of the modulator 14, and a corresponding frequency multiplier in place of the demodulator 27.

Where the invention is applied to the magnetic tape recording of color television signals as in the embodiments so far disclosed, the choice of the transfer frequency used to record the control signal on the tape is conveniently tied in with the characteristics of the tape recorder used, as will now be described.

Shown in FIG. 6 is a typical response curve of a conventional magnetic tape recorder which represents the amplitude of the recorded signal on an arbitrary scale as a function of signal frequency. The response curve is seen to present a series of loops of generally decreasing peak amplitude, separated by zero-amplitude nodes at a series of frequency values such as 0, $F_0$, $F_1$, $F_2$. These node frequencies correspond to wavelengths of the signal which theoretically, are integral submultiples of the effective width of the recording head used. A detailed description of this property of magnetic transducer heads may be found in "Magnetic Recording Techniques," by W. T. Stewart (McGraw-Hill Publishing Co.), pages 68 and following. In the recording of TV signals, matters are so arranged that the spectrum of the modulated TV signal, as indicated by the bandwidth M in the chart, is substantially contained within the compass of the initial loop of the response curve, preferably in an intermediate portion of it. According to the present invention, it is found convenient to use a transfer frequency $f_2$ for the control signal derived from the burst, of such value that the resulting bandwidth, as indicated at N, is positioned within the second loop of the response curve, i.e. above the first nodal frequency $F_0$ but below the second node $F_1$. By way of indication, in one standard type of TV tape recorded, the nodal frequencies $F_0$, $F_1$ and $F_2$ have values of about 10, 20 and 30 megacycles respectively. The bandwidth M may be about 3–8 mc., and N about 12–14 mc.

FIG. 6 also indicates the alternative possibility, mentioned above, of using a transfer frequency $f_2$ for the control signal lower than the lower limit of the modulated TV signal bandwidth, as indicated at N′, e.g. in the 1–2 mc. band. A further alternative possibility contemplated herein is to use a control signal transfer frequency $f_2$ higher than the upper limit of the TV signal band and below the first nodal frequency $F_0$, as indicated at N″.

With the moduland frequency $f_2$ differing considerably from the resonance frequency of the windings of the recording head such as 17 (FIG. 1), the amplifier such as 16 should possess a high gain to compensate for the resulting attenuation in the recording of the control signal. Further, suitable compensating circuits not shown, may be provided to improve the transfer characteristic of the recording head with regard to the control signal.

FIGS. 9 and 10 illustrate the invention as embodied in a transmission-reception system, rather than in a recording-reading system as so far described. These figures are largely self-explanatory in the light of the disclosure made so far, and hence will only require a summary description.

In the color television transmitter apparatus partially shown in FIG. 9, a total color television signal, generally similar in form to the one described with reference to FIG. 13 (*a*), is applied by input line 101 to the modulating input of a modulator 102, in which it modulates a carrier wave at frequency $f_1$. The modulated television signal is passed through an adder circuit 103 to a power amplifier 105 and feed to an antenna 107 whence it is radiated.

The input signal on line 101 is simultaneously tapped to the input of a first control signal generating circuit 106, which may be similar to the circuit described with reference to FIGS. 11 and 12. The first control signal from circuit 106 is applied to a modulator 114 where it modulates a suitable moduland frequency $f_2$. The modulated control signal from modulator 114 is applied to the second input of adder 103 where it is added to the modulated input signal. Thus the final transmitted signal radiated from antenna 107 comprises the sum of the conventional color TV signal plus a first control signal in accordance with this invention, of the form shown in FIG. 13 line *d*, impressed on a suitable carrier frequency $f_2$ suitably selected outside the bandwidth of the color TV signal.

At the receiving end, shown in FIG. 10, the received signal from antenna 109 is passed through the conventional tuned R-F amplifier 111, mixer 113 where it is heterodyned with a local oscillator signal, I-F amplifier 115, and video detector 117. The detected video signal is then applied to a filter 124 where it is separated into a video signal component, appearing on line 125, and a first control signal component on line 126. The video signal on line 125 is applied to the variable delay device 129 which may be similar to the circuit described with reference to FIGS. 3 and 4. The variably delayed video signal, delivered on the output line 132, is passed to the conventional color picture tube circuits, not shown. The output signal on line 132 is further tapped to the input of the second control signal generator circuit 136, which may be similar to the circuit of FIGS. 11–12, and the second control signal from circuit 136 is applied to one input of comparator 144. The other input of the comparator is fed with the first control signal as present on line 126 of filter 124, after demodulation with the $f_2$ frequency in demodulator 127. The error output from comparator 144 (which may be similar to the circuit described with reference to FIG. 5) is fed to the delay controlling input of variable delay device 129.

As will be apparent from explanation earlier given, the variably delayed video signal applied by output line 132 to the color picture tube circuits, not shown, is corrected for transfer disturbance (including in this case fluctuations in propagation conditions incurred in the electromagnetic link from antenna 107 to antenna 109). The chrominance component in said signal continuously retains its correct relative phasing throughout the scanning of each line. The color stability in the resulting picture is thus greatly enhanced over what is achieved in conventional color television systems.

While a few illustrative embodiments of improved color TV systems according to the invention have been described and illustrated, it will be evident that a great many other embodiments and modifications are possible. For example, while the receiving arrangement shown in FIG. 10 involves feedback control of the variable delay device and is to that extent comparable to the record-playing arrangement of FIG. 2, any of the alternative control arrangements referred to in connection with FIGS. 7 and 8 in the case of record-playing applications, could also be used in the case of a television receiver. The functional and circuit diagram shown in the drawings are simplified in that various conventional components inessential to the invention have been omitted. Wherever such components may be found desirable or necessary for the practice of the invention they will be readily inserted by those familiar with the art. Thus, adjustable delay devices may advantageously be interposed in the main or/and control signal channels of the various embodiments disclosed in order to permit of equalizing the signal transfer times through different channels and facilitate initial phase alignment. The various partial circuits here shown were especially designed for use with color television signals of a type conforming with the specifications laid down by the NTSC in the United States and other countries, thereby facilitating the adaptation of the invention to that important class of system. It should be understood however that the apparatus disclosed herein would be applicable with relatively minor changes, to color television systems of other types, and also to communication and information transfer systems other than color television. Thus, the invention is applicable to systems wherein no burst signal is inherently provided, but wherein a burst signal, generally similar to the one referred to here, along with the improved control signal means of this invention, can be especially introduced for purposes of synchronization.

What I claim is:

1. In a system for recording and reading information including a recording section having recorder means for impressing upon a record medium both an information-bearing signal in the form of a carrier angle-modulated with said information, and an angle-reference signal in the form of a recurrent burst of a frequency corresponding to that of said carrier, and a reading section reader means for recovering both said signals from the record medium and means for demodulating the recovered information-bearing signal to retrieve the information therefrom while using the recovered burst signal as an angle-reference in said information-retrieving step, the combination comprising:

means in said recording section for deriving from said burst signal a first angle-control signal substantially time-coextensive with said information;

means in said recording section for changing the frequency of said first control signal to a value outside the frequency occupied by both said information-bearing and burst signals;

means in the recording section for impressing said frequency-changed control signal on said medium together with said information-bearing and burst signals;

means in said reading section for recovering said first control signal from the record medium separately from the information bearing and burst signals;

means in the reading section for changing the frequency of said recovered first control signal back to said burst frequency;

means in the reading section for deriving from the recovered burst signal a second angle-control signal substantially time-coextensive with said information;

comparing means connected to receive said recovered first control signal and said second control signal and delivering an error signal representative of time disagreement therebetween;

and variable delay means connected in the path of the recovered information and connected for operation by said error signal to compensate for said time disagreement.

2. The system defined in claim 1 wherein said recorded and reader means have a frequency response that is vanishingly small at each of a series of spaced frequency values and said information-bearing and burst signals have a total frequency range below a first one of said spaced frequency values, and said means for changing the frequency of said first control signal are arranged to change said frequency of said first control signal to a value higher than said first frequency value.

3. The system defined in claim 1 including modulator means in the recording section for changing the frequency of said first control signal prior to impression on said record medium and demodulator means in the reading section for changing the frequency of the recovered first control signal back to said burst frequency.

4. The system defined in claim 1 including frequency-multiplier means in the transfer section for changing the frequency of said first control signal prior to impression on said record medium and frequency-divider means in the reading section for changing the frequency of the recovered first signal back to said burst frequency.

5. The system defined in claim 1 including frequency-divider means in the recording section for changing the frequency of said first control signal prior to impression on said record medium and frequency-multiplier means in the reading section for changing the frequency of the recovered first control signal back to said burst frequency.

6. The system defined in claim 1 wherein the means for deriving an angle control signal time-coextensive with said information comprises gating means operated to pass said recurrent burst signal and frequency-selective means connected to the gating means for producing said control signal at the burst frequency.

7. The system defined in claim 1, wherein the second control signal deriving means is connected to derive the second control signal from the recovered burst signal beyond said variable delay means whereby to provide a feedback control loop.

8. The system defined in claim 1, wherein the second control signal deriving means is connected to derive the second control signal from the recovered burst signal ahead of said variable delay means whereby to provide a direct control loop.

9. The system defined in claim 1, wherein the variable delay means is connected in the path of the recovered information-bearing signal ahead of the information-retrieving demodulator means.

10. The system defined in claim 1, wherein the variable delay means is connected in the path of the recovered information signal beyond the information-retrieving demodulator means.

11. The system defined in claim 1, wherein said variable delay means comprises a delay line having an input connected to receive said recovered information signal and having a first output delivering a moderately delayed signal and a second output delivering a fully delayed signal having a substantially greater delay than has said moderately delayed signal; a mixing network having a first, second and third inputs respectively connected to receive said recovered information signal, said moderately delayed signal and said fully delayed signal and having an output delivering a resultant signal; variable-gain means connected in said first and third inputs of the mixing network; means connected to receive said error signal and having two outputs and delivering balanced voltages at said outputs when the error signal has a determined intermediate magnitude and responsive to departures of the error signal from said intermediate magnitude to vary reversibly said output voltages from their balanced values by amounts and in a sense corresponding to the amount and sense of departure of the error signal from said intermediate value; and means applying said output voltages to said respective gain varying means, whereby to vary the delay of said resultant signal over said recovered information signal in dependency on the magnitude of the error signal.

12. The system defined in claim 1, which is a color television system and said information comprises chrominance information.

References Cited

UNITED STATES PATENTS

| | | | |
|---|---|---|---|
| 3,253,237 | 5/1966 | Runyan | 179—100.25 |
| 3,347,997 | 10/1967 | Woodruff | 178—6.6 A |

OTHER REFERENCES

Electronics: Jan. 1, 1960, pp. 76–79. Joseph Roizen: Magnetic Recording of Color Television.

ROBERT L. GRIFFIN, *Primary Examiner.*

R. MURRAY, *Assistant Examiner.*

U.S. Cl. X. R.

178—6.6